Sept. 1, 1964     D. TRAUFLER     3,147,016
ANNULAR GASKETS

Filed March 9, 1962     2 Sheets-Sheet 1

Sept. 1, 1964     D. TRAUFLER     3,147,016
ANNULAR GASKETS

Filed March 9, 1962     2 Sheets-Sheet 2

United States Patent Office 3,147,016
Patented Sept. 1, 1964

3,147,016
ANNULAR GASKETS
Daniel Trauffler, 53 Rue Sauffroy, Paris, France
Filed Mar. 9, 1962, Ser. No. 178,691
Claims priority, application France Apr. 6, 1959
4 Claims. (Cl. 277—226)

The present invention relates to annular gaskets comprising a hollow deformable annular casing and a liquid filling said casing.

The object of my invention is to provide a gasket of this type which is better adapted to meet the requirements of practice than those known up to this time.

For this purpose, according to my invention, the casing is provided with corrugations the ridges of which run along closed curves, and advantageously concentric circles, so as to improve the resiliency and resistance of the gasket.

Preferred embodiments of the present invention will be hereinafter described with reference to the appended drawings given merely by way of example and in which.

Figure 1:
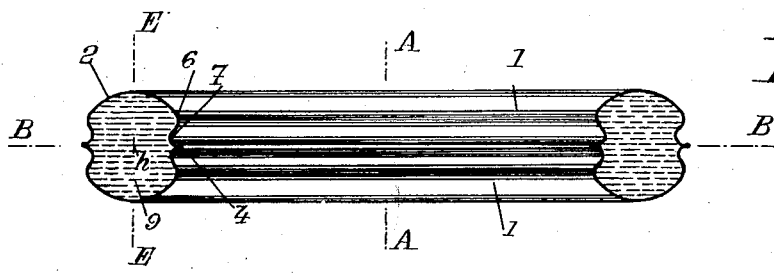
FIG. 1 is a section of an axial plane of a gasket made according to an embodiment of my invention.
Figure 2:
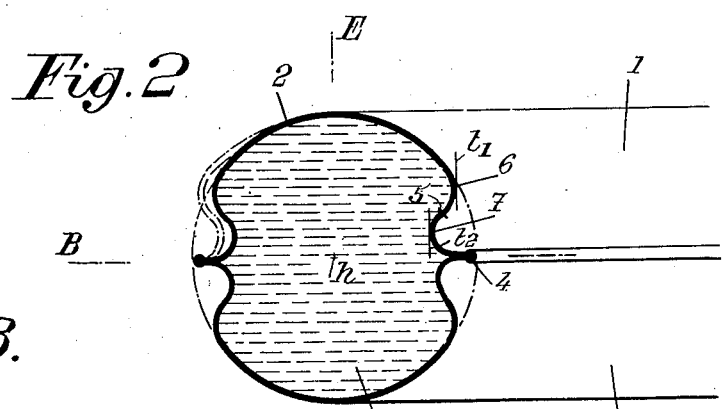
FIG. 2 is a view showing a portion of FIG. 1 on an enlarged scale.

In the embodiment of my invention illustrated by FIGS. 1 and 2 the gasket consists of a metallic hollow casing filled with a liquid. This casing 1, of toroidal shape, is made of two halves identical to each other and disposed symmetrically with respect to an assembly plane B—B. These casing halves have lateral flanges which are assembled together in assembly plane B—B and are sealed together by means of welds 3 and 4 extending along two concentric circles having their center on the tore axis A—A.

In this example, the cross section of casing 1 by a plane passing through axis A—A is a circle having its center at $g$.

The respective cross sections of the two halves of casing 1 by a plane passing through axis A—A are curves extending between the welds 3 and 4 and symmetrical with respect to a line E—E passing through $h$ and perpendicular to B—B.

Every half of each of these curves (for instance that located on the right of line E—E for the curve corresponding to the upper half of casing 1) comprises a concave (toward the outside) portion 7, a point of inflection 5, and a convex portion comprising a part of small radius of curvature 6 and a part 2 (joined tangentially to said part 6) and belonging to a circle having its center at $h$.

The curvatures of the corrugations corresponding to the parts 6 and 7 of the above described curves, are chosen in accordance with the magnitude and the nature of the stresses to which the gasket is to be subjected.

Casing 1 is filled with a liquid 9, the nature and the physical or chemical properties of which are chosen, as will be hereinafter stated.

Since the overall volume of the liquid in casing 1 remains constant, this liquid is displaced by the deformations due to the compression of the gasket, and applies stresses on the two halves of the casing.

The function of the corrugations 6–7 is to absorb the deformations due to the compression applied in the direction E—E to surfaces 2 so that these corrugations are themselves deformed as shown in dotted lines in FIG. 2.

An important effect of corrugations 6–7 associated with the two contact zones 2 is that these contact zones are floating with respect to each other, which permits compensation to be obtained to some extent for any defect of parallelism between the two surfaces between which the gasket is compressed.

The two halves of the casing might have their flanges located in a conical surface of axis A—A, instead of being located in a plan perpendicular to A—A.

Figure 3:
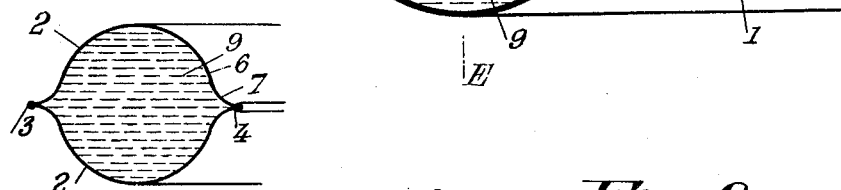
FIGS. 3, 4, 5 and 6 are views similar to FIG. 2, but on a smaller scale, showing different modifications.

The embodiment of FIG. 3 is similar to that of FIGS. 1 and 2, but the radii of curvature of parts 6 and 7 are greater. However, it should be noted that in the construction of FIGS. 1–2, parts 6 and 7 have respective tangents ($t_1$ and $t_2$) parallel to direction E—E and located on opposite sides of the point of inflection 5. This arrangement gives the maximum of flexibility to the casing. In the construction of FIG. 3 parts 6 and 7 have no such tangents and the flexibility is not so great.

Figure 4:
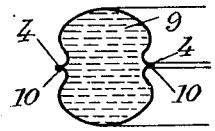

The embodiment of FIG. 4 is similar to that of FIGS. 1–2 but, in this case, welds 3 and 4 are protected and reinforced by circular bands or clips 10.

Figure 6:
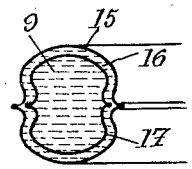

FIG. 6 shows a joint having a section similar to that of FIG. 2 but having a supplementary outer wall 15 forming a jacket around the inner chamber 17, the liquid 16 in the jacket portion being either the same as, or different from, the liquid 9 with which the inner chamber is filled.

Figure 7:
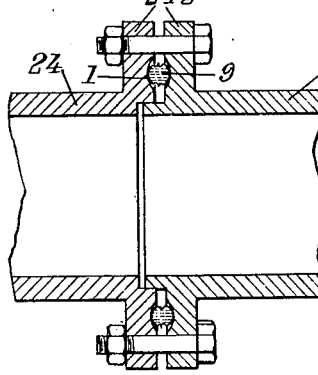
FIG. 7 is an axial view of two pipes connected together by a gasket according to my invention.

FIG. 7 shows a simple practical example of the application of a toroidal gasket as above described to provide a fluid-tight seal between two pipes 24 and the outside, the pipes being provided with flanges 24a, as shown. The pressure applied by the flanges on the gasket is obtained by means of bolts.

Figures 5, 8:
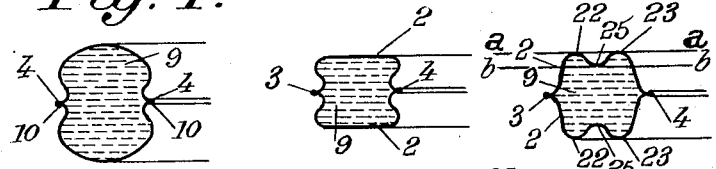
FIG. 8 is a radial section of a gasket made according to another embodiment of my invention.

FIG. 8 illustrates another feature of my invention.

The sides of the casing are made as above (as a matter of fact they are similar to what is shown by FIG. 3). But the contact zones of the gasket, instead of being of simple convex shape (FIGS. 1–2, 3, 4 and 6) or flat (FIG. 5), are corrugated. In other words the cross-section curve of each casing half has a portion thereof (that corresponding to the contact zone of the gasket) of undulated shape inscribed tangentially between lines $a$—$a$ and $b$—$b$ parallel to the assembly plane (which passes through welds 3 and 4). The points of tangency 22, 23 and 25 of this curve portion with said lines $a$—$a$ and $b$—$b$ correspond to the outer and inner ridges of the two circular corrugations formed on the contact zones of the gasket.

It will be understood that if the gasket is sufficiently flattened by the pressure applied thereon, the inner ridges 25 may be tightly applied against each other, thus dividing the inside of the casing into two separate concentric annular chambers.

Figure 9:
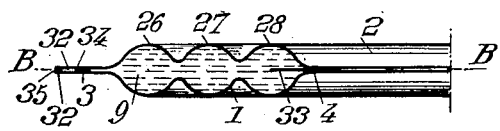
FIG. 9 is a view similar to FIG. 8 but showing a modification.
Figure 10:
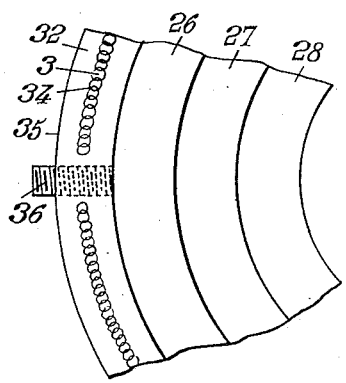
FIG. 10 is a plan view of the gasket of FIG. 9.

In the construction of FIG. 9 there are three concentric circular corrugations 26, 27 and 28. In this construction the cross sections of the casing halves are curves having an undulated shape and made of a succession of circular arcs so that the ridges in contact with the surfaces applied against the gasket can roll along these surfaces when the gasket undergoes radial deformations.

Figure 12:
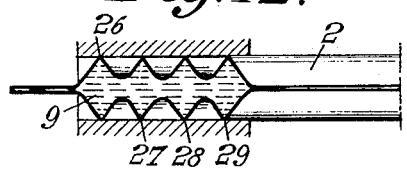
FIG. 12 is a view similar to FIG. 9 showing a modification.

However it is possible to give the ridges of the corrugations an angular shape as illustrated by FIG. 12 where these outer ridges are adapted to penetrate into the substance of the surfaces in contact with the gasket, said ridges being for instance made of stainless steel whereas the above mentioned surfaces are coated with indium. In the construction of FIG. 12 there are four corrugations 26, 27, 28 and 29.

Figure 11:
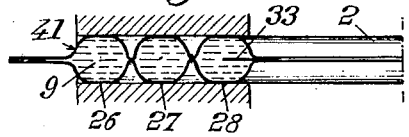
FIG. 11 is a view similar to FIG. 9 but showing the gasket flattened by an axial pressure applied thereto.

Anyway the corrugations are arranged in such manner that when the gasket is compressed between annular surfaces, the bottoms of the corrugations of the respective faces of the gasket are brought into tight contact with one another so that the inside of the metallic casing is divided into a plurality of independent concentric chambers, as shown by FIG. 11.

In the above described example, the gaskets are of toroidal shape. However they might be of any suitable shape so as to have closed outlines, for instance rectangular outlines, the corrugations having corresponding shape.

Advantageously the lateral edges of the gasket extend outwardly and inwardly, respectively, to form flat annular flanges acting for reinforcement purposes. Of course only one of the above mentioned edges may be provided with such a flange.

These flanges, such as shown at 32 and 33, may be secured to the halves of the gasket casing or between them or they may also consist of extensions of the walls of said casing.

Assembly of the two gasket halves is effected by welding (either electric welding or arc welding) or by an electronic bombardment.

If, as shown by FIGS. 9 to 12, the external flanges 32 of the gasket are sufficiently wide, it is advantageous to limit the welded zone to an annular area 34 having a relatively small radial width and disposed substantially in the middle part of the flange. Such an arrangement permits slight deformations of the portion of the flanges adjoining the corrugations without enabling said flanges to move away from each other to an excessive degree. In addition to this, the outer edges 35 of the flanges may be further welded together.

During assembly I leave between the flanges of the two casing halves, at lease one small filling tube, or nipple, 36 forming a communication between the inside and the outside of the gasket.

After the two halves of the gasket have been assembled together the inside of said gasket is filled with liquid 9 through the nipples 36.

In order to close the nipples permanently it suffices to cut them off and to crush them so that the orifice is closed and to fill and cover the orifice thus stopped by a small amount of solder.

Figure 13:
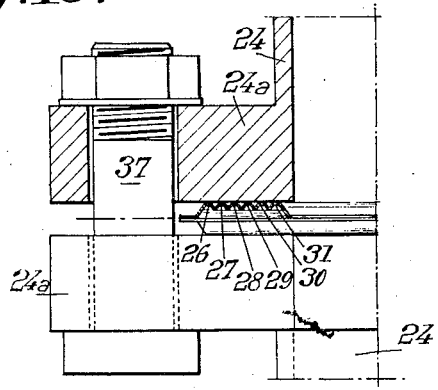
FIG. 13 is a view similar to FIG. 7 but with a different gasket.

FIG. 13 shows how a gasket according to my invention is mounted between two pipe elements 24 in line with each other. The gasket, including corrugations 26, 27, 28, 29, 30 and 31 is tightly held between two flanges 24a of said pipes 24 by means of bolts 37.

Figure 14:
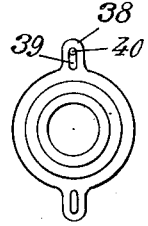
FIGS. 14 and 15 are plan views of two modifications of the gasket according to my invention.
Figure 15:
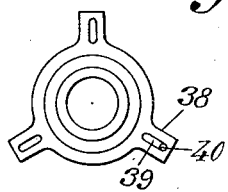

In order to facilitate the accurate centering of the gasket with respect to the elements between which it is interposed, I advantageously provide the external flange of said gasket with lugs 38 (FIGS. 14 and 15) provided with radial slots 39. These slots are intended to accommodate guiding rods 40 carried by one of the two above mentioned elements and adapted slidably to engage corresponding housings of the other element.

When the two elements such as 24 are forced toward each other so as to compress the corrugations of the gasket between flanges 24a, the liquid 9 present in the gasket, and the total volume of which practically does not change, exerts pressures on the walls of the casing in directions perpendicular to the common axis of elements 24.

As the welds 3 and 4 (and also the reinforcing flanges such as 32 and 33) are practically non deformable, the radial pressure exerted by the liquid produces deformations of the corrugations, which are inflated. Thus the two annnular contact areas 2 are mounted, so to speak, in a radially floating manner with respect to each other, being separated from each other by an elastic mounting equivalent to bellows means. Such mounting permits of compensating to some degree for the lack of parallelism that may exist between the surfaces of flanges 24a applied against the gasket corrugations.

It must be pointed out that the deformations of the gasket due to the crushing action exerted thereon are resilient deformations, owing to the nature and chiefly to the particular shape of this gasket. Therefore the gasket returns to its initial shape as soon as the crushing effort is removed, contrarily to what would take place in the case of a gasket of purely toroidal shape. This is particularly advantageous in that it permits of reutilizing the gasket a great number of times and that said gasket exerts a correct sealing action even when the surfaces between which it is interposed move slightly away from each other.

Among the metals or alloys that may be used for making the casing halves, I may cite in particular the following ones:

Alloys the main element of which is aluminum and in particular aluminum-magnesium allows, such as those designated by the trademark AG Duralinox (AG3, AG5 or AG7);

Alloys the main element of which is copper such as gun metal, beryllium bronze, cupronickel, the alloy designated by the trademark Thombac, this alloy comprising 85% of copper and 15% of zinc, electrolytic copper;

Some steel such: high resistance construction steels available in sheets, in the cases where corrosion phenomenons are not to be feared; stainless steels and in particular those stabilized by means of titanium, molybdenum or niobium, to avoid transformations thereof during welding; refractory steels preserving their mechanical characteristics (resistance to creeping, breaking, strength, resiliency) at high temperatures and after a long time, such as austenitic steels and nickel chromium and tungsten steels;

Alloys having nickel as main component such as those named under the trademarks Monel, Inconel, Nimonic and Hastelloy;

Metals and alloys having a high melting point and consisting chiefly of titanium, molybdenum, tungsten, tantalum, etc.

The thickness of the walls of the metallic casing must be chosen to conciliate strength and resiliency. For practical purposes the thickness reaches from 0.2 to 2 mm. Of course this thickness may vary at different points of the gasket, being for instance greater in the resilient areas.

The filling liquid 9 must have as much as possible of the following characteristics:

Wide range of utilization temperatures;
Low viscosity at low temperatures;
Small variation of the viscosity index when the pressure varies;
Low coefficient of thermal expansion;
Good thermal conductivity and high specific heat;
Low vapor tension;
High coefficient of compressibility;
No combustibility;
Chemical inertia with respect to the metal of the casing;
Sensibility to coloration by fluorescent or luminescent substances to permit detection of leaks;
Good resistance to nuclear radiations, such as gamma rays.

As examples of such liquids we may cite silicone containing oils or greases, hydraulic liquids as used in aviation, such as that known under the trademark Oneryl, which may be used at high temperature, silica or alumina gels, bentonites, some graphite containing products such as that designated by the trademark S.T.A.P.–TE 2409, which can be used at high temperature and even molten metals or alloys such as molten tin, the eutectic mixture Na–K, gallium and so on.

The gasket according to my invention permits of obtaining very good sealing properties to prevent leak of a fluid the pressure of which may range from vacuum to 1000 hpz and the temperature of which may range from −60 to +1000° C. and even possibly +1500° C. in some cases (the pressure and temperature range of utilization depending of course upon the materials used for making the gasket).

The tightening force exerted axially upon the gasket by the elements between which said gasket is interposed depends of course upon the pressure of the fluid which is to be prevented from leaking. As a rule this force should range from 3 to 10m×kg.

It should be noted that a local leak of the gasket, for instance at the point marked 41 in FIG. 11 does not suddenly cancel the sealing effect of the gasket, owing to the fact that the inside thereof is divided into a plurality of separate chambers due to the inner ridges of the respective halves being applied tightly against one another.

Some examples of gaskets according to my invention will now be given.

*Example 1.*—The casing is made of a sheet, 0.6 mm. thick, of chromium nickel austenitic steel of the type designated by AFNOR Z 3 CN 18–10. The liquid present in the gasket, consisting essentially of diphenyl and phenyl oxide, has the following properties:

| | |
|---|---|
| Melting point | 12° C. |
| Boiling point | 330° C. |
| Density (at 20° C.) | 1.06. |
| Absolute viscosity (at 20° C.) | 6 centipoises. |
| Engler viscosity | 1.45. |

The joint thus obtained, of the type disclosed by FIG. 5 and the dimensions of which correspond to the standard dimension of AFNOR flanges for a nominal diameter of 50 mm. is capable of resisting a pressure of 500 hpz at temperatures ranging from −60° C. and +300° C.

*Example 2.*—The casing is made of chromium nickel austenitic steel of the type corresponding to AFNOR Z 10 CNT 18–1O. The liquid is the same as the Example 1. Such a gasket is capable of resisting a pressure of 1000 hpz at ordinary temperature.

*Example 3.*—The envelope is made of cobalt austenitic steel of the following average composition Co=50, Cr=20, Ni=10, W=15, Fe lower than 3 and C=0.1. The liquid is the alkaline eutectic mixture of sodium and potassium melting at −13° C. This gasket is capable of resisting a pressure of 500 hpz at temperatures ranging from 13 and +800° C.

In a general manner, while I have, in the above description, disclosed what I deem to be a practical and efficient embodiment of my invention, it should be well understood that I do not wish to be limited thereto as there might be changes made in the arrangement, disposition and form of the parts without departing from the principle of the present invention as comprehended within the scope of the accompanying claims.

This application is a continuation in part of my U.S. patent application Ser. No. 22,075 filed April 6, 1960, for "Improvements in Annular Gaskets."

What I claim is:

1. An annular gasket which comprises a hollow deformable annular metallic casing and a liquid filling said casing, said metallic casing being made of two opposed elements having respective lateral flanges welded together in an assembly plane, the respective cross sections of said two casing elements by a radial plane perpendicular to said assembly plane being two curves having each an undulated portion tangentially inscribed between two lines parallel to said assembly plane, said two curve portions being symmetrical with respect to said assembly plane, said casing elements thus having respective corrugated portions facing each other, with their inner ridges located opposite one another.

2. An annular gasket which comprises a hollow deformable annular metallic casing in the form of a toroid and a liquid filling said casing, said metallic casing being made of two opposed halves welded together in an assembly plane, perpendicular to the axis of said toroid, the respective cross sections of said two halves by a plane passing through said axis being two curves having each an undulated portion tangentially inscribed between two lines parallel to said assembly plane, said two curves being symmetrical with respect to said assembly plane, so that said casing halves have respective circularly corrugated portions facing each other and which may be brought into contact with each other along the inner circular ridges of their corrugations when the gasket is compressed in the direction perpendicular to said assembly plane, thus forming separate concentric annular chambers.

3. A gasket according to claim 2 further comprising at least one lateral flange carried by said casing halves and extending in said assembly plane.

4. A gasket according to claim 2 further comprising lateral flanges integral with said casing halves and extending in said assembly planes, the two flanges located on the outer edge of the gasket being welded together and the two flanges located on the inner edge of the gasket being welded together.

References Cited in the file of this patent

UNITED STATES PATENTS

| | | |
|---|---|---|
| 1,917,175 | Willis et al. | July 4, 1933 |
| 1,942,704 | Hubbard et al. | Jan. 9, 1934 |

FOREIGN PATENTS

| | | |
|---|---|---|
| 550,298 | France | Dec. 9, 1922 |
| 794,663 | Great Britain | May 7, 1958 |